United States Patent
Freeman

(10) Patent No.: US 9,259,852 B2
(45) Date of Patent: Feb. 16, 2016

(54) SEMIAUTOMATIC FRAMING AND SHEATHING SYSTEMS

(71) Applicant: Steve Freeman, Reno, NV (US)

(72) Inventor: Steve Freeman, Reno, NV (US)

(73) Assignee: Steven Freeman, Reno, NV (US)

( * ) Notice: Subject to any disclaimer, the term of this patent is extended or adjusted under 35 U.S.C. 154(b) by 218 days.

(21) Appl. No.: 14/151,749

(22) Filed: Jan. 9, 2014

(65) Prior Publication Data

US 2015/0190894 A1    Jul. 9, 2015

(51) Int. Cl.
*B23P 19/04* (2006.01)
*B27F 7/00* (2006.01)
*B25B 11/02* (2006.01)

(52) U.S. Cl.
CPC .................. *B27F 7/006* (2013.01); *B23P 19/04* (2013.01); *B25B 11/02* (2013.01); *Y10T 29/53961* (2015.01)

(58) Field of Classification Search
CPC ......... E04F 21/0007; B25H 1/08; B25H 1/10; B25H 1/00; B62B 3/108; B25B 11/02; B25B 11/00
See application file for complete search history.

(56) References Cited

U.S. PATENT DOCUMENTS

| | | | | |
|---|---|---|---|---|
| 2,305,124 A * | 12/1942 | Wilson, Jr. | ............... | B25B 11/02 227/152 |
| 2,540,106 A * | 2/1951 | Eichelberger | ............. | B27F 7/02 227/152 |
| 2,662,565 A * | 12/1953 | Le Vay | .................... | B25B 11/02 227/152 |
| 2,754,862 A * | 7/1956 | Kemp, Jr. | ............. | B27M 3/0073 227/152 |
| 3,591,067 A * | 7/1971 | Vial | ..................... | B27M 3/0073 227/100 |
| 3,592,376 A * | 7/1971 | Moehlenpah | ........... | B27F 7/006 227/101 |
| 3,629,931 A * | 12/1971 | Stanley | ..................... | B27F 7/02 100/913 |
| 3,734,376 A * | 5/1973 | Abernathy | ................ | B27F 7/02 227/111 |
| 3,811,167 A * | 5/1974 | Schneider | ............ | B27M 3/0073 269/305 |
| 3,848,791 A * | 11/1974 | Jureit | ........................ | B27F 7/02 227/100 |
| 3,866,644 A * | 2/1975 | Stubbs | ..................... | B25H 1/02 269/307 |
| 3,933,348 A * | 1/1976 | Tidwell, Jr. | .......... | B27M 3/0073 269/297 |
| 4,154,436 A * | 5/1979 | Sellers | ................. | B27M 3/0073 269/14 |
| 4,330,921 A * | 5/1982 | White, Jr. | ............. | B27M 3/0073 227/152 |
| 8,176,610 B1 * | 5/2012 | Arrington | ............... | B25B 23/00 269/134 |

* cited by examiner

Primary Examiner — Lee D Wilson
Assistant Examiner — Tyrone V Hall, Jr.

(57) ABSTRACT

The present invention describes a system for framing and sheathing wall panels. The system comprises a framing jig, sheathing jig, computer, carriage, photoelectric eyes, pneumatic or hydraulic rams, solenoids and other triggers, controls, switches, and banks of nail guns. The system can be quickly or automatically adjusted for building walls with various sized studs, stud spacing, and for building walls of varying height. The system helps to automate the framing process, which increases speed, accuracy, and decreases wasted materials. This quickly and safely produces squared panels with precise stud placement by means of a framing jig and stud brackets, reducing the time needed to assemble walls.

11 Claims, 7 Drawing Sheets

SEMIAUTOMATIC FRAMING AND SHEATHING SYSTEMS

REFERENCE TO RELATED APPLICATIONS

This patent application claims the benefit of U.S. Provisional Application No. 61/750,659 filed on Jan. 9, 2013, the disclosure of which is incorporated herein by reference in its entirety.

BACKGROUND OF THE INVENTION

1. Field of the Invention

This invention relates to a framing and sheathing system for manufacturing wall panels, and more particularly to a semiautomatic system for framing and sheathing wall panels.

2. Description of Related Art

The vast majority of new construction requires framing of the wall panels. Framing and sheathing jobs can be time consuming and potentially dangerous. In addition to the inconvenience and safety issues themselves, this can cause a job to become expensive. It can be particularly challenging to do a high quality job within specific time and money budgets using currently available methods. This often requires workers to work at a speed that decreases accuracy and precision when framing.

Therefore there is a need to have an improved framing and sheathing system that can help workers to work at a fast speed without compromising accuracy and precision when framing walls.

In view of the above, it is the principal object of the present invention to provide an improved framing and sheathing system which can manufacture wall panels at a fast speed yet without compromising accuracy and precision.

A further object is to provide an improved system which requires a minimum amount of manual intervention.

Yet another object is to provide a framing and sheathing system that produces wall panels at a competitive cost relative to the wall panels produced by the conventional techniques.

SUMMARY OF THE INVENTION

The present invention describes a system for framing and sheathing walls. The system comprises a framing jig, sheathing jig, computer, carriage, photoelectric eyes, pneumatic or hydraulic rams, solenoids and other triggers, stops, controls, switches, and banks of nail guns. The system can be quickly or automatically adjusted for building walls with various sized studs, stud spacing, and for building walls of varying height. The framing system allows automated nailing without any operator input. The system helps to automate the framing process, which increases speed, accuracy, and decreases wasted materials. This quickly and safely produces squared panels with precise stud placement by means of a framing jig and stud brackets, reducing the time needed to assemble walls by more than 70%.

In an exemplary embodiment of the present invention, there are disclosed a semiautomatic framing and sheathing system comprising a framing jig for framing a wall panel using a top plate, bottom plate and studs and a sheathing jig for attaching sheathing to the framed wall panel.

The system further comprises two parallel horizontal plate holders including a top plate holder to hold the top plate and a bottom plate holder to hold the bottom plate, the bottom plate holder being parallel to and spaced apart from the top plate holder, two parallel horizontal nail gun tracks including a top nail gun track above the top plate holder and a bottom nail gun track below the bottom plate holder, two parallel horizontal bars for mounting stud brackets including a top stud bracket bar below the top plate holder and a bottom stud bracket bar above the bottom plate holder, a plurality of spaced apart stud brackets removably attached to the stud bracket bars to hold the studs in place, a nailing device secured to and running the length of the horizontal nail gun tracks, four parallel vertical tubes attached to the plate holders having wheels to support the framing jig, and two pneumatic rams each connecting with two of parallel vertical tubes to adjust a distance between the two plate holders whereby adjusting a height of the wall panel. The stud brackets are removably and rigidly attached to the stud bracket bars in predetermined locations at a regular interval for conventional wall panels and can be detached and reattached to the stud bracket bars at different locations to adjust the space between studs.

The system further comprises two parallel horizontal carriage support rails including a top carriage support rail above the top plate holder and a bottom carriage support rail below the bottom plate holder, a motorized carriage supported by and extending between the two parallel carriage support rails, having two ends each having rollers to slide over each of the two carriage support rails and two separate parallel vertical nail gun tracks extending between the two ends, and—a nailing device including a plurality of nail guns secured to and running the length of the vertical nail gun tracks.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following

DESCRIPTION OF THE PREFERRED EMBODIMENT

Figure 1:
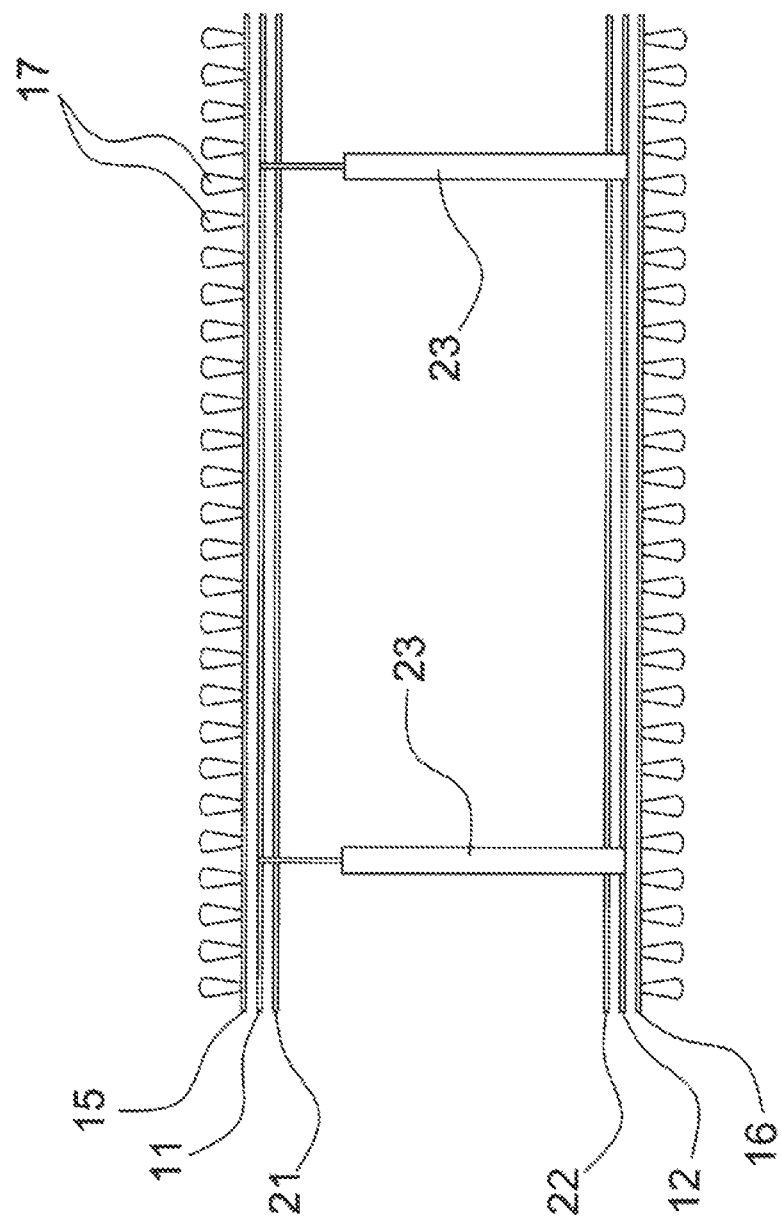
FIG. 1 shows a top view of the framing jig and other parts for framing a wall panel of the semiautomatic framing and sheathing system of the present invention.

Referring now to FIG. 1, there is shown an overhead view of the present invention. The device is comprised of a semi-automated framing system for use in construction of wall panels for residential construction. The system uses individual nail guns or banks of 40 or more pneumatic nail guns automatically controlled by photoelectric eyes, valves, solenoid triggers, rams and computers.

The system 100 comprises a framing jig 10. Referring to FIG. 1, there is shown a top view, of the framing jig 10 and parts involving in the process of framing wall panels according to one embodiment of the present invention. The system comprises a framing jig 10 which may be constructed from angle iron and square tubing. The system 100 further comprises a pair of horizontal angle iron plate holders including a top 11 and bottom 12 plate holders that run parallel to each other holding the top and bottom plates of a wall panel in place. The system 100 further comprises a pair of nail gun tracks which run horizontally and parallel to one another including a top nail gun track 15 which is above the top plate holder and a bottom nail gun track 16 which is below the bottom plate holder. The pair of nail gun tracks provides a place to attach a nailing device 17 for each 16" or 24" OC stud. The system 100 further comprises a pair of horizontal and parallel bars for mounting stud brackets including a top bar 21 which is below the top plate holder and a bottom 22 bar which is above the bottom plate holder. The system 100 further comprises a nailing device 17. The system 100 further comprises stud brackets 19 (see FIG. 2) which are designed to hold the studs in place.

Figure 2:
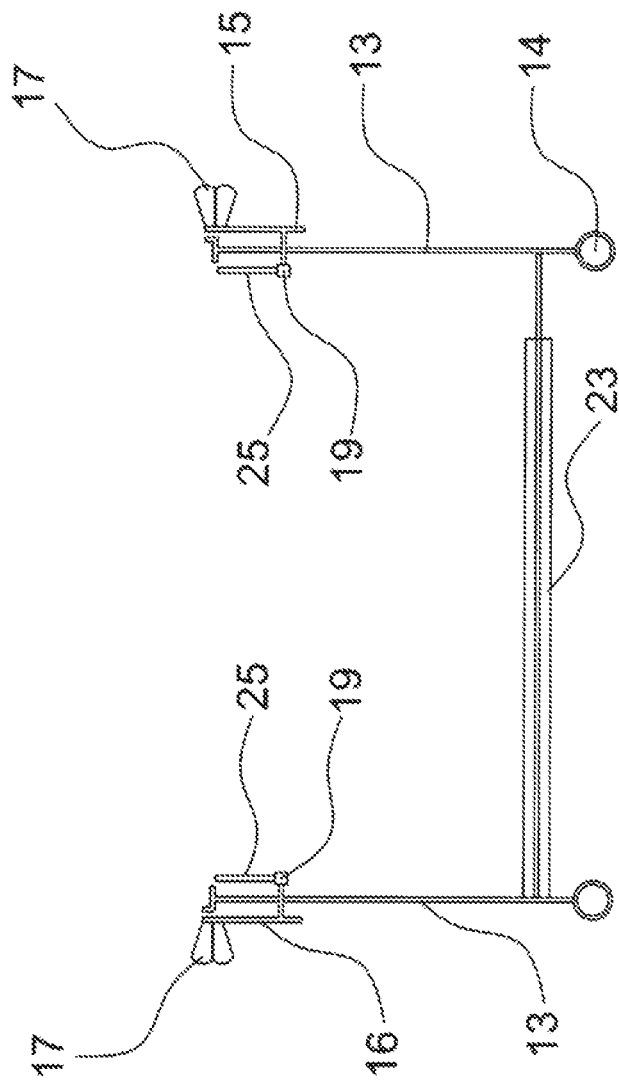
FIG. 2 shows a side view of nail gun tracks with attached nail guns and photoelectric eyes of the present invention of FIG. 1.

Referring to FIG. 2 there is shown a side view of nail gun tracks with attached nail guns 15, 16, nail guns 17, and stud bar 21, 22 with brackets 19 of the present invention. The system further comprises photoelectric eyes 25 or mechanical stops near the nail gun to sense the presence of the studs. The system 100 further comprises four vertical square tubes 13 that utilize either wheels 14 or stands. These tubes can attach to the plate holders 11, 12. Rollers 14 easily move the framed wall panel to the sheathing jig 40. See FIG. 2 Diagonal braces can be added to strengthen the frame.

Figure 3:
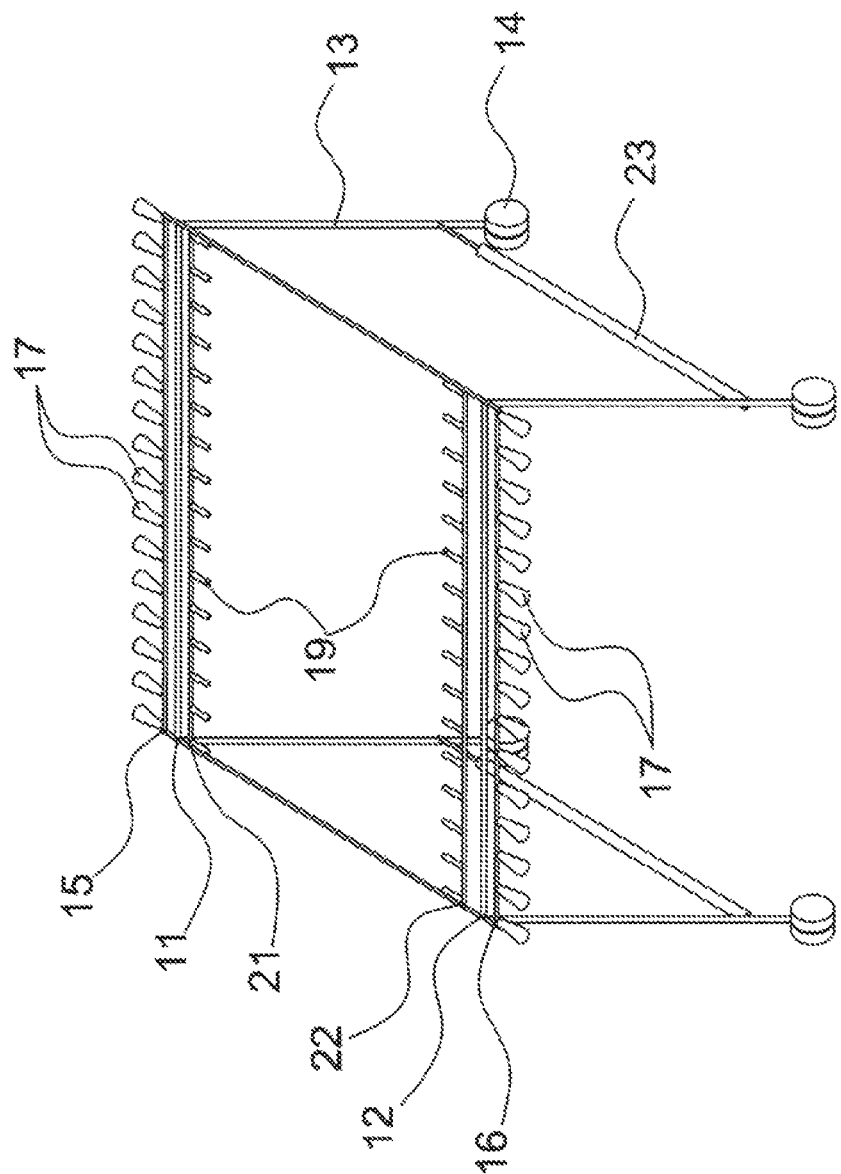
FIG. 3 shows an isometric view of the framing jig and other parts for framing a wall panel of the semiautomatic framing and sheathing system of the present invention.
Figure 4:
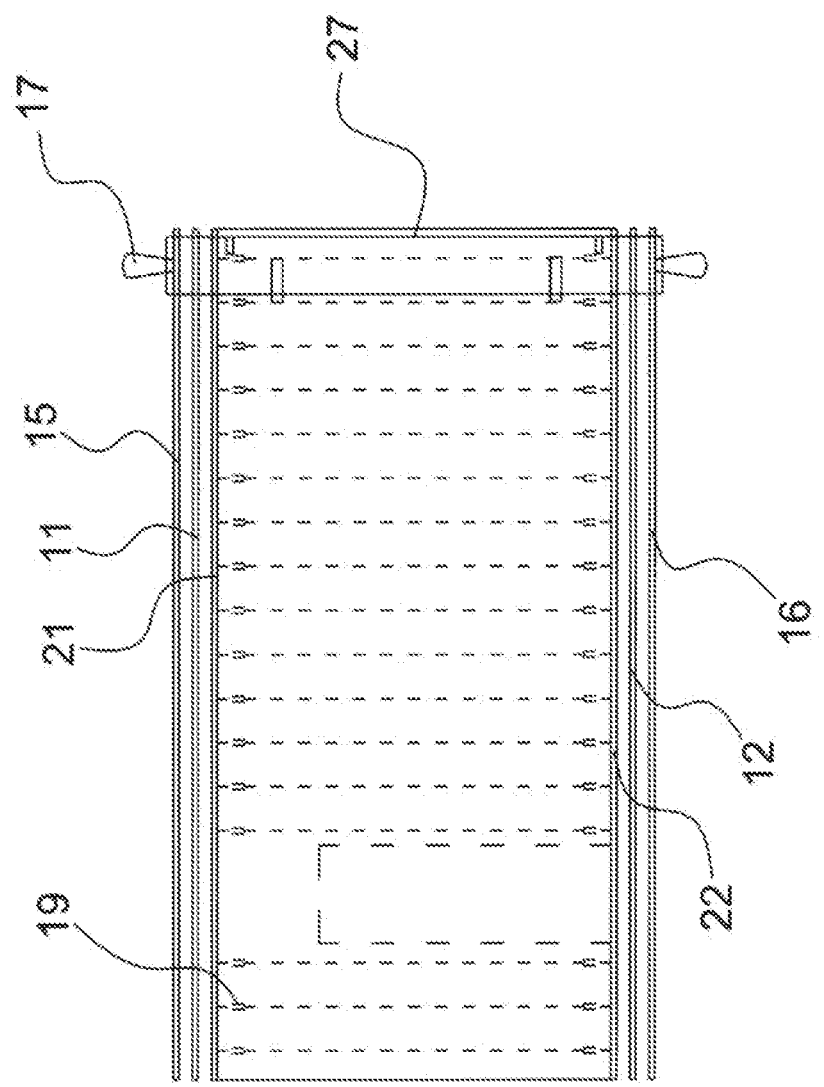
FIG. 4 shows a top view of the framing jig and other parts for framing a wall panel of the semiautomatic framing and sheathing system according to another embodiment of the present invention wherein the wall panel is on top of the framing jig.

To better illustrate the system, referring to FIG. 3 there is shown an isometric view of the framing jig 10 and other parts of the system 100 involving in framing. The system 100 further comprises pneumatic or hydraulic rams 23, each connecting to two parallel vertical supports 13 across the top and bottom plate holders 11, 12 to adjust the distance between the two plate holders whereby adjusting the height of the wall.

In one embodiment, the stud brackets are of U-shape. In one embodiment, the location where the stud brackets 19 are attached to the stud bracket bars are predetermined so that a worker does not need to measure and mark the location of the studs on the top and bottom plates and thus can save time for framing wall panels. The brackets may be rigidly affixed to the bracket bars at regular intervals. The regular intervals between the brackets may be fixed at any of a number of common dimensions employed in framing for the spaces between studs. For example, a common spacing would be 16 and/or 24 inches on center. However, in another embodiment, the stud brackets 19 may be detached from and repositioned at or slid to different locations along the stud bracket bars to achieve a different spacing, so that the space between studs can be adjusted.

In one embodiment, the nailing device 17 includes 40 or more nail guns as shown in FIGS. 1 and 3. The location where the nail guns attached to the nail gun tracks are predetermined. The nail guns may be rigidly attached to the nail gun tracks at regular intervals corresponding to the intervals of the stud brackets so that the nail guns can appropriately apply nails to fasten the studs to the plates. In this embodiment, each nail guns may be controlled by corresponding photoelectric eyes. When the photoelectric eyes sense the presence of a stud, it activates the corresponding nail guns. When the photoelectric eye senses an open area, as in a window, it deactivates the nail gun.

Figure 5:
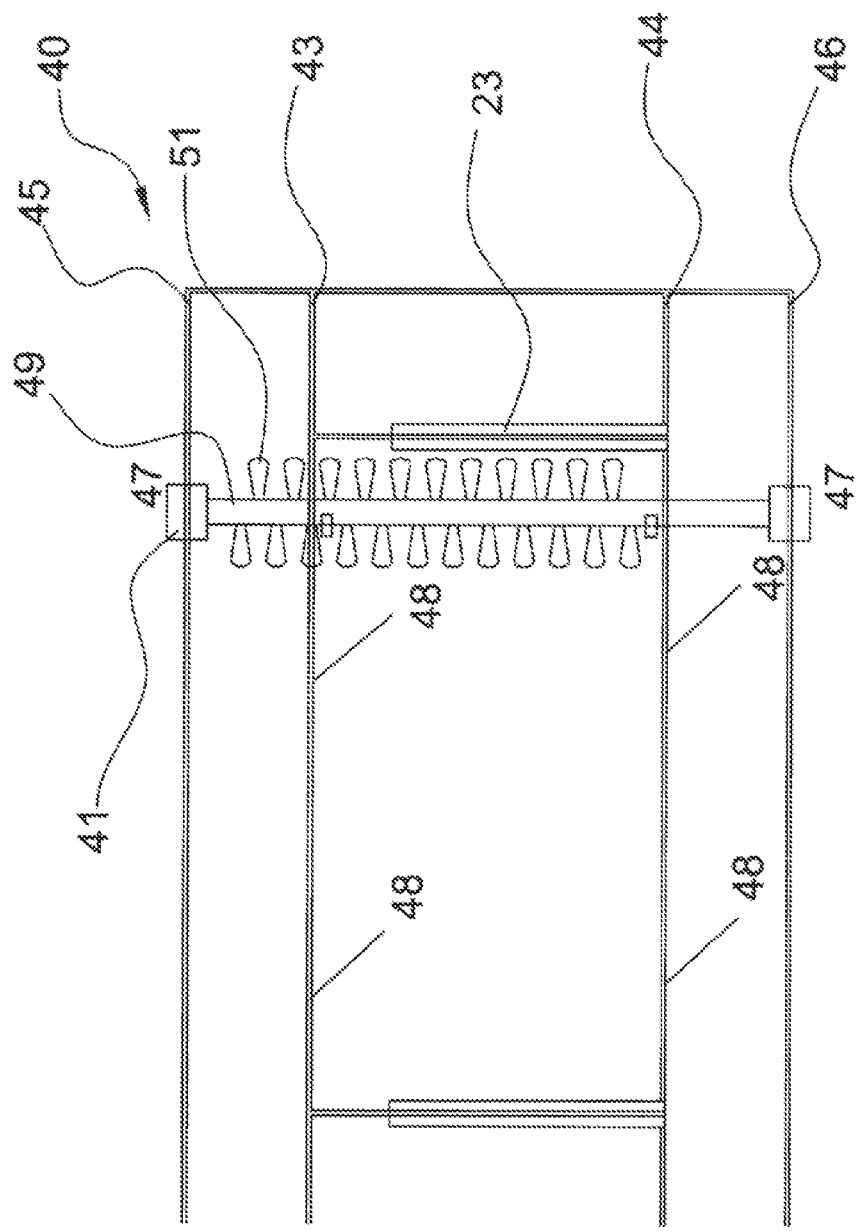
FIG. 5 shows a top view of the sheathing jig and carriage of the system according to the present invention.

Referring to FIG. 5 there is disclosed another embodiment of the framing jig of the present invention. In this embodiment, the nailing device 17 includes two nail gun banks with photoelectric eyes 25. Each nail gun bank with the photoelectric eye is attached to each end of a carriage 27 which slides along the nail gun tracks and apply nails to fasten studs to the plates when the photoelectric eyes sense the presence of a stud, it activates the corresponding nail gun. When the photoelectric eye senses an open area, as in a window, it deactivates the nail gun.

The system 100 further comprises a sheathing jig 40. Referring now to FIG. 5, there is shown an overhead view of the sheathing jig 40 and carriage with two nail gun tracks 41. The sheathing jig 40 utilizes the framing jig in FIGS. 1 and 2 for its base. The system further comprises a pair of horizontal angle iron plate holders including a top 43 and bottom 44 plate holders that run parallel to each other holding the top and bottom plates of a framed wall in place. The system 100 further comprises a pair of horizontal carriage rails 45, 46 which run parallel to and outside the top and bottom plate holders. It means the top carriage rail locates above the top plate holder and the bottom carriage rail locates below the bottom plate holder.

The system 100 further comprises a motorized carriage 41 which is supported by and extending between the two parallel carriage support rails. The motorized carriage has two ends 47 each having a roller 48 (as indicated in dashed line to show a transparent view) to slide over each of the two carriage support rails 45, 46 as well as two separate parallel vertical nail gun tracks 49 extending between the two ends 47.

Figure 6:
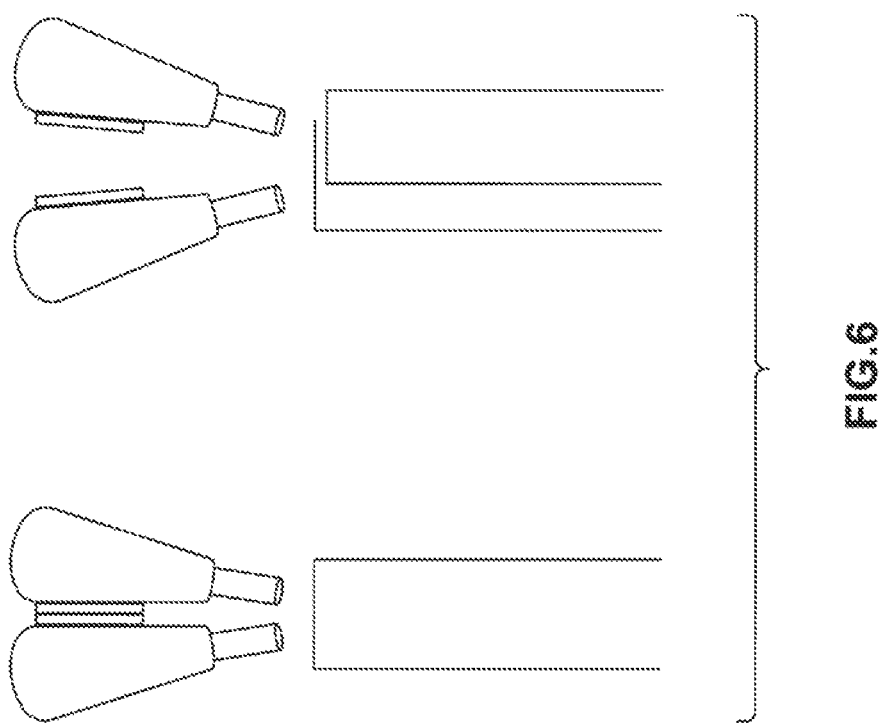
FIG. 6 shows a side view of nail gun bars of the system in FIG. 5.

The motorized carriage 41 extends between the two carriage support rails 45, 46, meaning the motorized carriage 41 spans the height of the wall plus the possible sheathing overlaps on the top and bottom of the wall panel. The system further comprises nail guns 51. The carriage 41 supports two separate nail gun tracks 49 with attached nail guns 51 that run the height of the wall, operating separately or together. The nail gun tracks slide vertically for 6", 4" or 2" edge nailing and horizontally for double studs (see FIG. 6). The carriage 41 moves sideways across the panel stopping to nail field and edges. When the carriage 41 reaches the end of the panel, the carriage returns in the opposite direction nailing sheathing to the bottom, top, and crown plates (and where applicable the top and bottom of windows and the top of door).

Figure 7:
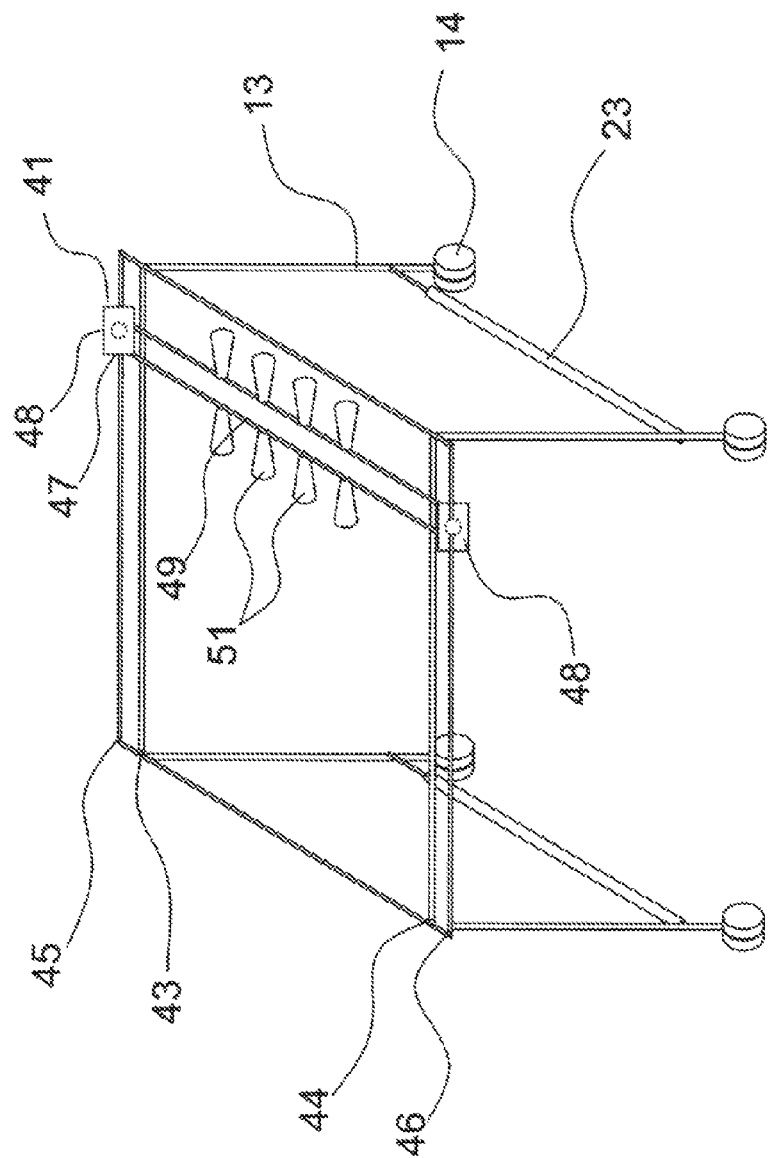
FIG. 7 shows an isometric view of the sheathing jig and carriage of the system according to the present invention.

To better illustrate the system for sheathing a framed wall, referring to FIG. 7 there is disclosed an isometric view of the sheathing jig 40 and carriage with two nail gun tracks 41.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A semiautomatic framing and sheathing system to automate the framing process for use in construction of wall panels, the semiautomatic framing and sheathing system comprising:
   a framing jig for framing a wall panel using a top plate, bottom plate and studs;
   two parallel horizontal plate holders including a top plate holder to hold the top plate and a bottom plate holder to hold the bottom plate, the bottom plate holder being parallel to and spaced apart from the top plate holder;
   two parallel horizontal nail gun tracks including a top nail gun track above the top plate holder and a bottom nail gun track below the bottom plate holder;
   two parallel horizontal bars for mounting stud brackets including a top stud bracket bar below the top plate holder and a bottom stud bracket bar above the bottom plate holder;
   a plurality of spaced apart stud brackets removably attached to the stud bracket bars to hold the studs in place;
   a nailing device secured to and running the length of the horizontal nail gun tracks;
   four parallel vertical tubes attached to the plate holders having wheels to support the framing jig; and
   two pneumatic or hydraulic rams each connecting with two of parallel vertical tubes to adjust a distance between the two plate holders whereby adjusting a height of the wall panel;
   wherein the stud brackets are removably and rigidly attached to the stud bracket bars in predetermined locations at a regular interval for conventional wall panels and can be detached and reattached to the stud bracket bars at different locations to adjust the space between studs.

2. The semiautomatic framing and sheathing system of claim 1, wherein the nailing device includes a plurality of individual nail guns.

3. The semiautomatic framing and sheathing system of claim 2, further comprising photoelectric sensors near the nail guns.

4. The semiautomatic framing and sheathing system of claim 3, wherein the nailing device secured to the horizontal nail gun tracks includes 40 or more pneumatic nail guns automatically controlled by photoelectric eyes, mechanical stop and computers when the photoelectric eyes sense the presence of a stud it activates the corresponding nail guns and when the photoelectric eyes sense an open area it deactivates the nail gun.

5. The semiautomatic framing and sheathing system of claim 3, further comprising a carriage extending between the two horizontal nail gun tracks and having rollers beneath both ends to slide sideway along the horizontal nail gun tracks, wherein the nailing device with stops includes two or more nail guns attached to the carriage at both ends of the carriage and the nail guns are automatically controlled by photoelectric eyes and computers when the photoelectric eyes sense the presence of a stud it activates the corresponding nail guns and when the photoelectric eyes sense an open area it deactivates the nail guns.

6. The semiautomatic framing and sheathing system of claim 4, further comprising:
   a sheathing jig for attaching a sheathing to a framed wall panel;
   two parallel horizontal plate holders including a top plate holder to hold top plate and the bottom plate holder to hold the bottom plate of the framed wall, the bottom plate holder being parallel to and spaced apart from the top plate holder;
   two parallel horizontal carriage support rails including a top carriage support rail above the top plate holder and a bottom carriage support rail below the bottom plate holder;
   a motorized carriage supported by and extending between the two parallel carriage support rails, having two ends each having rollers to slide over each of the two carriage support rails, and having two separate parallel vertical nail gun tracks extending between the two ends; and
   a nailing device including a plurality of nail guns secured to and running the length of the vertical nail gun tracks.

7. The semiautomatic framing and sheathing system of claim 6, wherein the nail guns slide vertically for 6 inches, 4 inches, or 2 inches edge nailing and horizontally for double studs.

8. The semiautomatic framing and sheathing system of claim 7, wherein the carriage moves sideways across the wall panel along the carriage support bars stopping to nail field and edges and when the carriage reaches the end of the panel it returns in the opposite direction nailing sheathing to the framed wall panel.

9. The semiautomatic framing and sheathing system of claim 5, further comprising:
   a sheathing jig for attaching a sheathing to a framed wall;
   two parallel horizontal plate holders including a top plate holder to hold top plate and the bottom plate holder to hold the bottom plate of the framed wall, the bottom plate holder being parallel to and spaced apart from the top plate holder;
   two parallel horizontal carriage support rails including a top carriage support rail above the top plate holder and a bottom carriage support rail below the bottom plate holder;

a motorized carriage supported by and extending between the two parallel carriage support rails, having two ends each having rollers to slide over each of the two carriage support rails and two separate parallel vertical nail gun tracks extending between the two ends; and a nailing device including a plurality of nail guns secured to and running the length of the vertical nail gun tracks.

10. The semiautomatic framing and sheathing system of claim 9, wherein the nail guns slide vertically for 6 inches, 4 inches, or 2 inches edge nailing and horizontally for double studs.

11. The semiautomatic framing and sheathing system of claim 10, wherein the carriage moves sideways across the wall panel along the carriage support bars stopping to nail field and edges and when the carriage reaches the end of the panel returns in the opposite direction nailing sheathing to the framed wall panel.

\* \* \* \* \*